United States Patent
Henry et al.

(10) Patent No.: US 11,531,530 B1
(45) Date of Patent: Dec. 20, 2022

(54) DYNAMIC AUTOMATION OF PREREQUISITE COMPONENT DEPLOYMENT IN DISCONNECTED ENVIRONMENTS

(71) Applicant: Red Hat, Inc., Raleigh, NC (US)

(72) Inventors: William Henry, Denver, CO (US); Lester Claudio, Denver, CO (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/404,807

(22) Filed: Aug. 17, 2021

(51) Int. Cl.
*G06F 8/61* (2018.01)
*G06F 8/65* (2018.01)
*G06F 8/10* (2018.01)
*G06F 8/41* (2018.01)
*G06F 9/455* (2018.01)

(52) U.S. Cl.
CPC .................. *G06F 8/63* (2013.01); *G06F 8/10* (2013.01); *G06F 8/433* (2013.01); *G06F 8/65* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 7,062,764 B2* | 6/2006 | Cohen | ........................ | G06F 8/60 709/221 |
| 7,590,981 B2* | 9/2009 | Gupta | ..................... | G06F 8/658 717/174 |
| 8,621,454 B2 | 12/2013 | Wookey | | |
| 9,134,988 B2 | 9/2015 | Cavazza et al. | | |
| 9,170,927 B1 | 10/2015 | Kuhl et al. | | |
| 9,182,966 B2 | 11/2015 | Avery et al. | | |

(Continued)

OTHER PUBLICATIONS

Conally, Dean. "How to Install and Correct Dependencies Issues in Ubuntu", Liquid Web, posted May 21, 2020 and updated on Mar. 4, 2021 (13 pages), located on the Internet at: https://www.liquidweb.com/kb/how-to-install-dependencies-in-ubuntu/.

(Continued)

*Primary Examiner* — Marina Lee
(74) *Attorney, Agent, or Firm* — Womble Bond Dickinson (US) LLP

(57) ABSTRACT

Systems and methods analyze for installing dependencies required for the installation of prerequisite components of cloud infrastructure to be installed in a disconnected environment are presented herein. An automation playbook generated after an assessment of a disconnected environment may be analyzed to determine a set of dependencies required by the automation playbook (e.g., packages and files required by each installation playbook called by the automation playbook). Each of the dependencies may be brought into the disconnected environment and installed as operating system packaging units, or deployed as containerized services. After all of the dependencies have been installed, a processing device may generate an installation report indicating whether the installation of each prerequisite component was successful or not. Upon determining that each of the prerequisite components was successfully installed, the processing device may install the cloud infrastructure on the disconnected environment.

20 Claims, 7 Drawing Sheets

(56) References Cited

U.S. PATENT DOCUMENTS

| | | | |
|---|---|---|---|
| 11,269,618 B1* | 3/2022 | Webster | G06F 3/0484 |
| 2002/0078142 A1* | 6/2002 | Moore | G06F 8/658 |
| | | | 709/217 |
| 2014/0033315 A1* | 1/2014 | Biswas | G06F 21/105 |
| | | | 726/26 |
| 2014/0189677 A1* | 7/2014 | Curzi | G06F 8/65 |
| | | | 717/171 |
| 2015/0378716 A1* | 12/2015 | Singh | H04L 67/10 |
| | | | 717/172 |
| 2017/0308367 A1* | 10/2017 | Clothier | G06F 8/61 |
| 2019/0121631 A1 | 4/2019 | Hua et al. | |
| 2020/0285504 A1 | 9/2020 | Siegmund | |
| 2022/0030066 A1* | 1/2022 | Govindaraju | H04W 4/70 |

OTHER PUBLICATIONS

Microsoft. "How NuGet resolves package dependencies", Aug. 14, 2017 (8 pages), located on the Internet at: https://docs.microsoft.com/en-us/nuget/concepts/dependency-resolution.

* cited by examiner

US 11,531,530 B1

DYNAMIC AUTOMATION OF PREREQUISITE COMPONENT DEPLOYMENT IN DISCONNECTED ENVIRONMENTS

TECHNICAL FIELD

Aspects of the present disclosure relate to disconnected environments, and more particularly, to installing cloud infrastructure within a disconnected environment.

BACKGROUND

A disconnected environment is one where a connection to outside systems via the internet or any other communication medium is non-existent or limited. In a disconnected environment, access to many intranet services can also be restricted. Such disconnected environments can be systems where the nature of information and/or technology capabilities available require a high degree of security, such as high security government systems.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
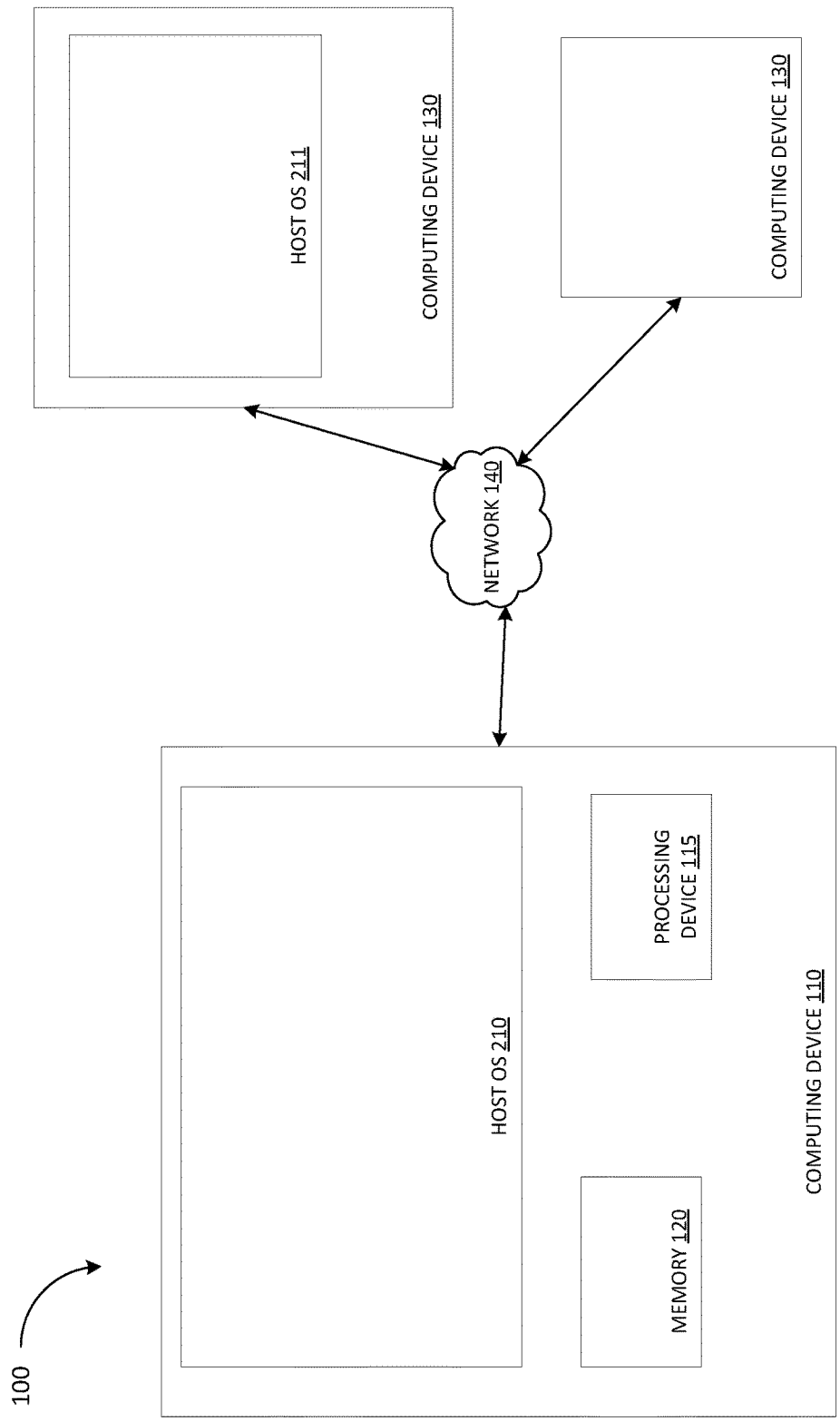
FIG. 1 is a block diagram that illustrates an example disconnected environment, in accordance with some embodiments of the present disclosure.

When installing cloud infrastructure, there are often a number of prerequisite available services (also referred to herein as prerequisite components) that must be installed in order to install and deploy the cloud infrastructure. Such prerequisite components are usually resolved easily if an internet or similar connection is available to obtain such prerequisite services. However, installing and deploying software on disconnected environments can present challenges owing to availability of prerequisite components within the disconnected environment, a lack of skills, knowledge, and/or access to those prerequisite components, and red tape involved in navigating access to those prerequisite components as well as procuring skills relevant to those prerequisite components. In addition, many of these prerequisite components are often not owned by the client or the vendor, making access to them without a connection to outside systems difficult.

This can cause numerous business disruptions within a disconnected environment. For example, the inability to procure prerequisite components can delay the deployment of cloud infrastructure software by a significant time frame, delay revenue recognition for consulting and other services, delay or inhibit the sale of further products of the vendor to the client (e.g., application services and/or middleware), and result in acute client dissatisfaction which can result in cancellation of services etc.

The present disclosure addresses the above-noted and other deficiencies by using a processing device to perform a complete assessment of a disconnected environment to determine which prerequisite components (dependencies) necessary for the installation of cloud infrastructure are missing from the disconnected environment. The processing device may import an offline bundle into the disconnected environment, wherein the offline bundle comprises an assessment playbook for performing the assessment. The processing device may determine initial environment information, perform the assessment, and generate (using the assessment playbook) a report providing information about each of the missing prerequisite components and any additional environment information pertinent thereto. The processing device may also generate, based on the report, an automation playbook for installing and deploying the missing prerequisite components. For each missing prerequisite component, the automation playbook may include a callout to an installation playbook corresponding to the missing prerequisite component. The offline bundle may include a set of installation playbooks, each installation playbook providing functionality to install and deploy a particular prerequisite component. It should be noted that the techniques described herein are not limited to installation of simple software on a single machine, but may apply to complex cloud infrastructures deployed across multiple machines. No third party tools are relied on for the assessment of the disconnected environment or the generation of the report or the automation playbook.

The present disclosure further addresses the above-noted and other deficiencies by using a processing device to analyze an automation playbook generated after an assessment of a disconnected environment (e.g., by an assessment playbook as described herein) to determine a set of dependencies required by the automation playbook (e.g., packages and files required by each installation playbook called by the automation playbook). Each of the dependencies may be brought into the disconnected environment as part of the offline bundle either as an operating system packaging unit or as a container image. If the dependencies are brought in as operating system packaging units, the processing device may use a software package manager to install each of these dependencies on the disconnected environment and may also use the software package manager to update and remove dependencies from the disconnected environment as necessary. If the dependencies are brought in as container images, the processing device may use a registry that is part of the offline bundle, and a container image installer (e.g. Docker/Podman/Skopeo) to install the image(s) on the processing device image directory or into the registry of the disconnected environment. If the disconnected environment lacks a container image registry, then that too would be installed by the processing device before other images are installed.

After all of the dependencies have been installed, the processing device may execute the automation playbook in order to install each of the prerequisite components, and then may call the assessment playbook again to determine whether the installation of each prerequisite component was successful. The processing device may also generate an installation report indicating whether the installation of each prerequisite component was successful or not, as well as indicating what prerequisite components were installed and the particular configurations for each installation. Upon determining that each of the prerequisite components was successfully installed, the processing device may install the cloud infrastructure on the disconnected environment.

FIG. 1 is a block diagram that illustrates an example system 100 which may be a disconnected environment on which cloud infrastructure such as a container orchestration engine is to be installed. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Because system 100 is a disconnected environment, network 140 may be a private network (e.g., a local area network (LAN) or wide area network (WAN)) implemented using a wired or a wireless infrastructure. For example, the network 140 may be implemented using one or more wireless communications systems, such as a WiFi™ hotspot connected with the network 140. In some embodiments, the network 140 may be an L3 network. The network 140 may carry communications (e.g., data, message, packets, frames, etc.) between computing device 110 and computing devices 130. As discussed herein, the system 100 may lack (or have limited access to) any connection to outside systems, via the internet or any other communication medium.

Each computing device 110 and 130 may include hardware such as processing device 115 (e.g., processors, central processing units (CPUs)), memory 120 (e.g., random access memory (RAM), storage devices (e.g., hard-disk drive (HDD), solid-state drive (SSD), etc.—not shown)), and other hardware devices (e.g., sound card, video card, etc.—not shown). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 respectively, as discussed in more detail below. The host OS of a computing device 110 or 130 may manage the execution of other components (e.g., software, applications, etc.) and/or may manage access to the hardware (e.g., processors, memory, storage devices etc.) of the computing device.

The system 100 may be an example of a system on which a container orchestration engine (one example of cloud infrastructure—not shown) may be installed. The container orchestration engine (referred to herein as container host 214) may execute on the host OS 210 of computing device 110 and the host OS 211 of computing devices 130. The container host 214 may be a platform for developing and running containerized applications (such as e.g., the Redhat™ OpenShift™ platform) and may allow applications and the data centers that support it to expand from just a few machines and applications to thousands of machines that serve millions of clients. The container host may provide an image-based deployment module for creating containers and may store one or more image files for creating container instances. Many application instances can be running in containers on a single host without visibility into each other's processes, files, network, and so on. Each container may provide a single function (often called a "microservice") or component of an application, such as a web server or a database, though containers can be used for arbitrary workloads. In this way, the container host provides a function-based architecture of smaller, decoupled units that work together.

A typical deployment of the container host may include a control plane (not shown—which may be implemented on computing device 110) and a cluster of worker nodes (not shown—which may be implemented on computing devices 130). The control plane may include REST APIs which expose objects as well as controllers which read those APIs, apply changes to objects, and report status or write back to objects. The control plane manages workloads on the worker nodes and also executes services that are required to control the worker nodes. By their nature, containerized applications are separated from the operating systems where they run and, by extension, their users. The control plane may expose applications to internal and external networks by defining network policies that control communication with containerized applications (e.g., incoming HTTP or HTTPS requests for services inside the cluster).

The cluster of worker nodes are where the actual workloads requested by users run and are managed. The worker nodes advertise their capacity and a scheduler (not shown), which is part of the control plane, determines which worker nodes containers and pods will be started on. Each worker node includes functionality to accept and fulfill requests for running and stopping container workloads, and a service proxy, which manages communication for pods across worker nodes. A worker node may be implemented as a virtual server, logical container, or graphics processing unit (GPU), for example.

It follows based on the above discussion that cloud infrastructure such as the container host may depend on numerous prerequisite components that must exist within the system 100 before it can be installed. Because system 100 is a disconnected environment, it may lack an appropriate means by which prerequisite components needed to install the container host can be procured. However, system 100 may provide a secure means for allowing boundary access from e.g., a secure external system or device of the client (not shown) that is located in physical proximity to the system 100 via computing device 110. Using the secure means, content can be brought into the system 100 on a limited basis in order to start assessing the system 100 and installing/providing various prerequisite components as discussed in further detail herein. For example, a vendor may generate the content and bring it physically to the client where it may be transferred to and verified by a secure system or device of the client external to the system 100. The system 100 may support the use of an encrypted link such as a virtual private network (VPN) tunnel or other appropriate secure communication channel between computing device 110 and the secure client system or device on which the content may be located. Although embodiments of the present disclosure are discussed with respect to installation of a container host for description and example purposes, the present disclosure is not limited in this way and the embodiments described herein may be applied to installation of any appropriate cloud infrastructure software on a disconnected environment.

Figure 2:
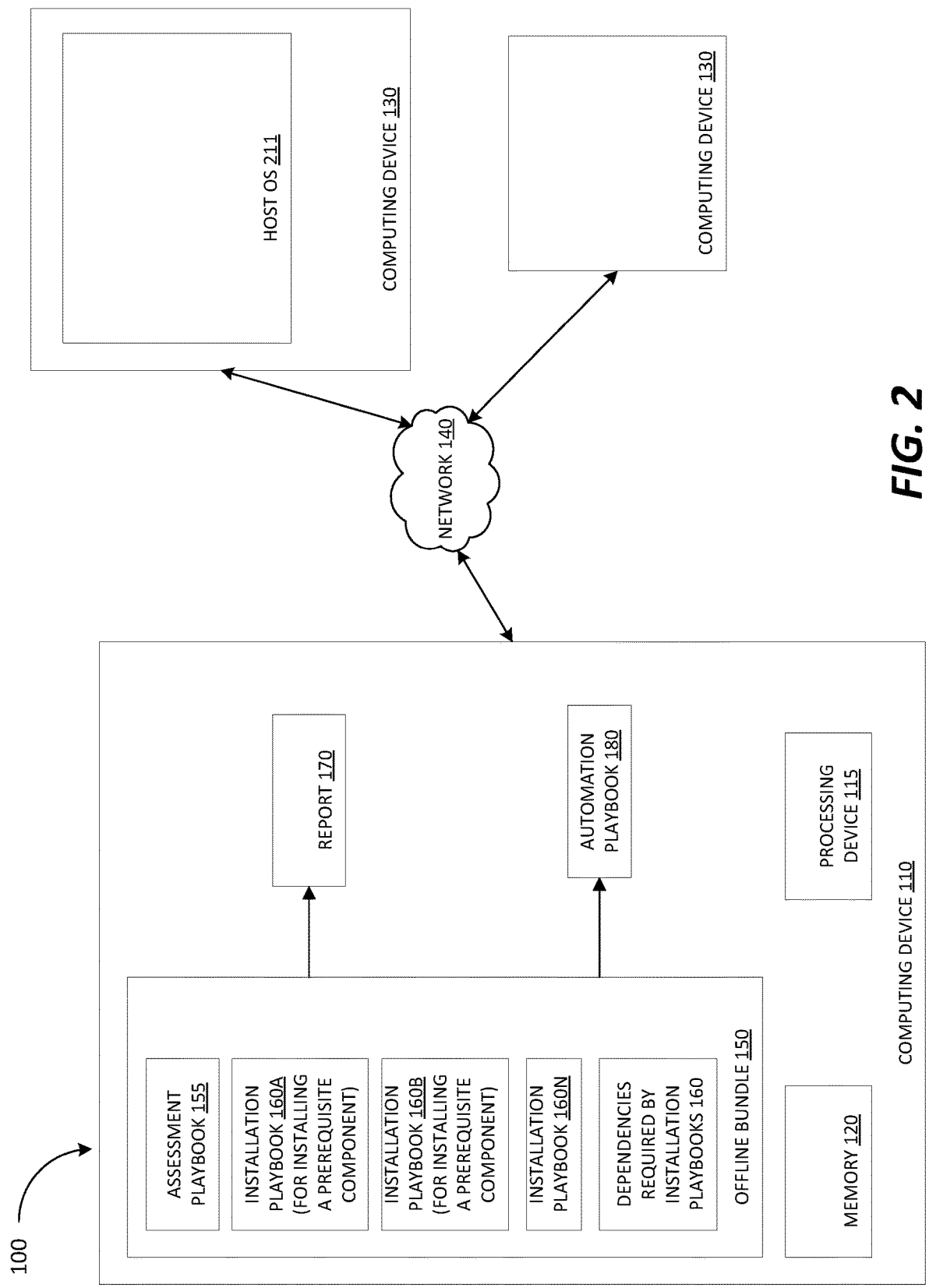
FIG. 2 is a block diagram that illustrates functionality for assessing a disconnected environment for missing prerequisite components, in accordance with some embodiments of the present disclosure.

Referring now to FIG. 2, in order to install the container host, a client operating the system 100 may import an offline bundle 150 (e.g., the vendor content) from a secure client system or device outside of system 100 as discussed above. The offline bundle 150 may comprise a data file that includes within it an assessment playbook 155, a set of installation playbooks 160, and various other images (e.g., container host images, registry images, dnsmasq, core operating system images—not shown), executables (e.g., container host installer 190 and base installation script 195 illustrated in FIGS. 3A and 3B), and binaries (not shown). A playbook may comprise prewritten code/scripts (usable on an ad-hoc basis or as starting template) that can act as a blueprint of an automation task, which may be a complex information technology (IT) action executed with limited or no human involvement. One example of a playbook may be an Ansible™ playbook, which may provide a stateful method for automating IT actions. Playbooks can declare configurations, orchestrate steps of any manual ordered process on multiple sets of machines in a defined order, and launch tasks synchronously or asynchronously. Playbooks can be used to automate IT infrastructure (such as operating systems and Kubernetes platforms), networks, and security systems, among others. Playbooks may be executed on a set, group, or classification of hosts, and may offer a repeatable, re-usable, simple configuration management and multi-machine deployment system that is well suited to deploying complex applications. It should be noted that although described with respect to Ansible playbooks, the embodiments of the present disclosure are not limited in this way and the assessment playbook 155 as well as each installation playbook may comprise any appropriate type of automation script.

The assessment playbook 155 may include a list of prerequisite components necessary for generation of the container host that it will check for the existence of, and functionality for checking for the existence of each prerequisite component on system 100. The functionality for performing each of these checks may be implemented as a role in the assessment playbook 155, and each role may run a command that tests for the existence of the corresponding prerequisite component. Because the assessment playbook 155 is providing an assessment for installation of cloud infrastructure across multiple machines (and not just installation of software on a single machine), it may perform checks for a variety of prerequisite component types including services, middleware services, and infrastructure services, for example. Example prerequisite components that the assessment playbook 155 may check for include storage requirements, a DHCP service, a DNS service, an image registry, an object storage, a package manager, an ignition webhost (e.g., an HTTP server such as Apache™ server or NGINX™ server) that will act as a bootstrap machine and dynamically serve HTTP content, network and application load balancers, and various required packages etc. For example, to check for the existence of a DNS service, the assessment playbook 155 may perform a name server (NS) lookup. If the NS lookup is unsuccessful, the assessment playbook 155 may determine that the DNS service is missing/non-existent. By having a defined list of prerequisite components that the assessment playbook 155 checks for whenever installing cloud infrastructure, embodiments of the present disclosure ensure consistency across cloud infrastructure installations.

In some embodiments, prior to checking for the existence of prerequisite components, the assessment playbook 155 may perform an initial check for environment information (also referred to as domain specific information) of the system 100, which may be used by the assessment playbook 155 as input variables when checking for the existence of the various prerequisite components. The environment information (not shown) may include information about the actual devices on the system 100 which will be communicating with the services, middleware services, and infrastructure services necessary for implementation of the container host. Examples of environment information may include subnet information such as IP addresses and names of devices within the system 100 (e.g., in order to make contact with them) as well as device designations (e.g., worker node, master node etc.). The assessment playbook 155 may also check to determine that the computing device 110 (on which the assessment playbook 155 is executing) has access permissions for those devices and that the assessment playbook is running as the root user on computing device 110.

Upon start-up, the assessment playbook 155 may also generate a report 170 for documenting missing prerequisite components. The report 170 may initially be empty upon generation, but as the assessment playbook 155 checks for each prerequisite component and determines missing prerequisite components, it may include information about those missing prerequisite components within the report 170. For example, if the assessment playbook 155 determines that a prerequisite component is missing (e.g., missing DNS service based on an unsuccessful NS lookup), it may generate an entry in the report 170 indicating the name and details of the missing prerequisite component, a short description of why the missing prerequisite component is required, a location within the offline bundle 150 where an installation playbook 160 corresponding to the missing prerequisite component may be located, and a reference to a uniform resource locator (URL) link to supporting documentation for the prerequisite component. It should be noted that the link cannot be used internally within the system 100 unless the supporting documentation has been moved within the system 100.

After the assessment playbook 155 performs checks to determine whether each of the prerequisite components exists or not, it may also determine additional environment information that is required for each of the prerequisite components. The additional environment information may correspond to environment information that is to be generated by each of the prerequisite components. For example, the assessment playbook 155 may identify a DNS service and generate container host cluster information such as a number of devices that are on the subnet as well as create DNS configurations for each of those devices (e.g., IP address, device name, device designation e.g., worker node, master node etc.). In another example, if the assessment playbook 155 detects a DHCP service, it may look at the DHCP node information and create DHCP configurations for each of those DHCP nodes. The assessment playbook 155 may add the additional environment information to the report 170.

Continuing to refer to FIG. 2, the offline bundle 150 may further include a set of install playbooks 160, each of which may function to install a particular prerequisite component. As the assessment playbook 155 determines which prerequisite components are missing and generates the report 170, it may simultaneously build an automation playbook 180 using install playbooks 160 that correspond to the missing prerequisite components. For example, in response to determining that the DHCP service is missing, the assessment playbook 155 may add to the automation playbook 180, a call to the install playbook 160A, which may function to install the DHCP service.

In some embodiments, the automation playbook 180 may also include information on where installation and deployment content for various dependencies is located. For example, in response to determining that the system 100 includes a package repository/package installer, the automation playbook 180 may indicate that the package repository is to be searched for particular missing prerequisite components before a call to an installation playbook 160 corresponding to the missing prerequisite component is added to the automation playbook 180. In some embodiments, if the assessment playbook 155 determines that the package repository is missing one sub-component (e.g., package or file) of a prerequisite component, it may use the appropriate install playbook 160 to install that sub-component into the package registry and then instruct the computing device 110 to install the sub-component from the package registry. Because the offline bundle 150 is open source, it may be used to bring a wide variety of playbooks, images, and executables etc. into the system 100, as well as updates to certain playbooks, images, and executables etc. Thus, although the automation playbook 180 is generated with callouts to certain installation playbooks 160, such call outs could call out to an installation playbook 160 that could change within any appropriate time period, for example.

When completed, the automation playbook 180 may include a callout to a number of install playbooks 160 to install the necessary prerequisite components. If certain missing prerequisite components depend on other missing prerequisite components, then the assessment playbook 155 may take these inter-prerequisite component dependencies into account when generating the automation playbook 180. More specifically, the assessment playbook 155 may determine the order in which the install playbooks 160 should be called (and thus, the order in which the prerequisite components are installed) based on the inter-prerequisite component dependencies and structure the automation playbook 180 accordingly.

In addition, the automation playbook 180 itself may have dependencies, as each installation playbook 160 may require other packages and files etc. (referred to herein as dependencies—not shown) in order to install the corresponding prerequisite component. Examples of such dependencies may include a registry, a dnsmasq, and an HTTP daemon, among others. There is a high probability that in a disconnected environment, these dependencies will not be available. Thus, these dependencies may be brought in as part of the offline bundle 150.

Figure 3A:
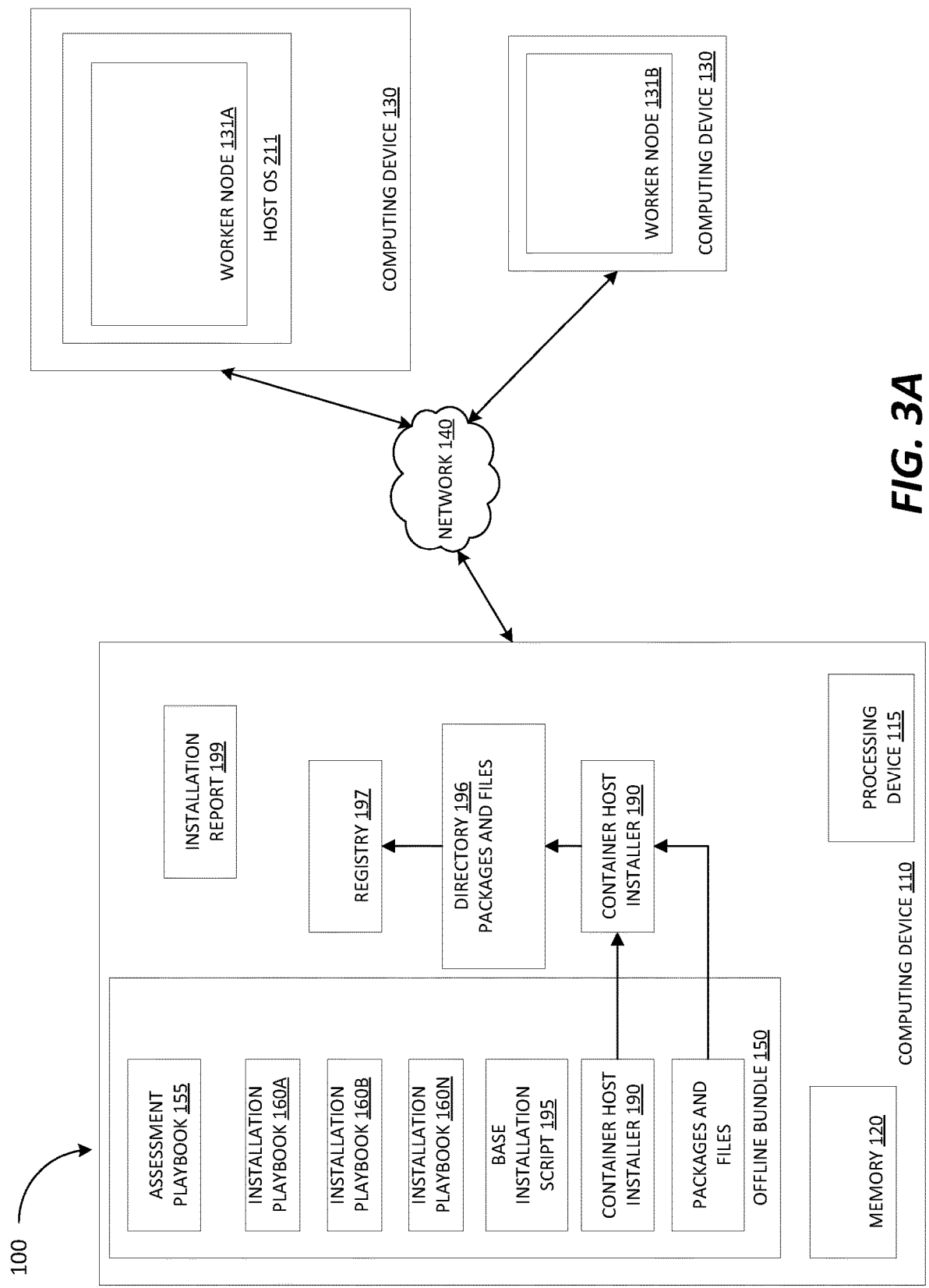
FIG. 3A is a block diagram that illustrates installation of dependencies for missing prerequisite components on a disconnected environment, in accordance with some embodiments of the present disclosure.
Figure 3B:
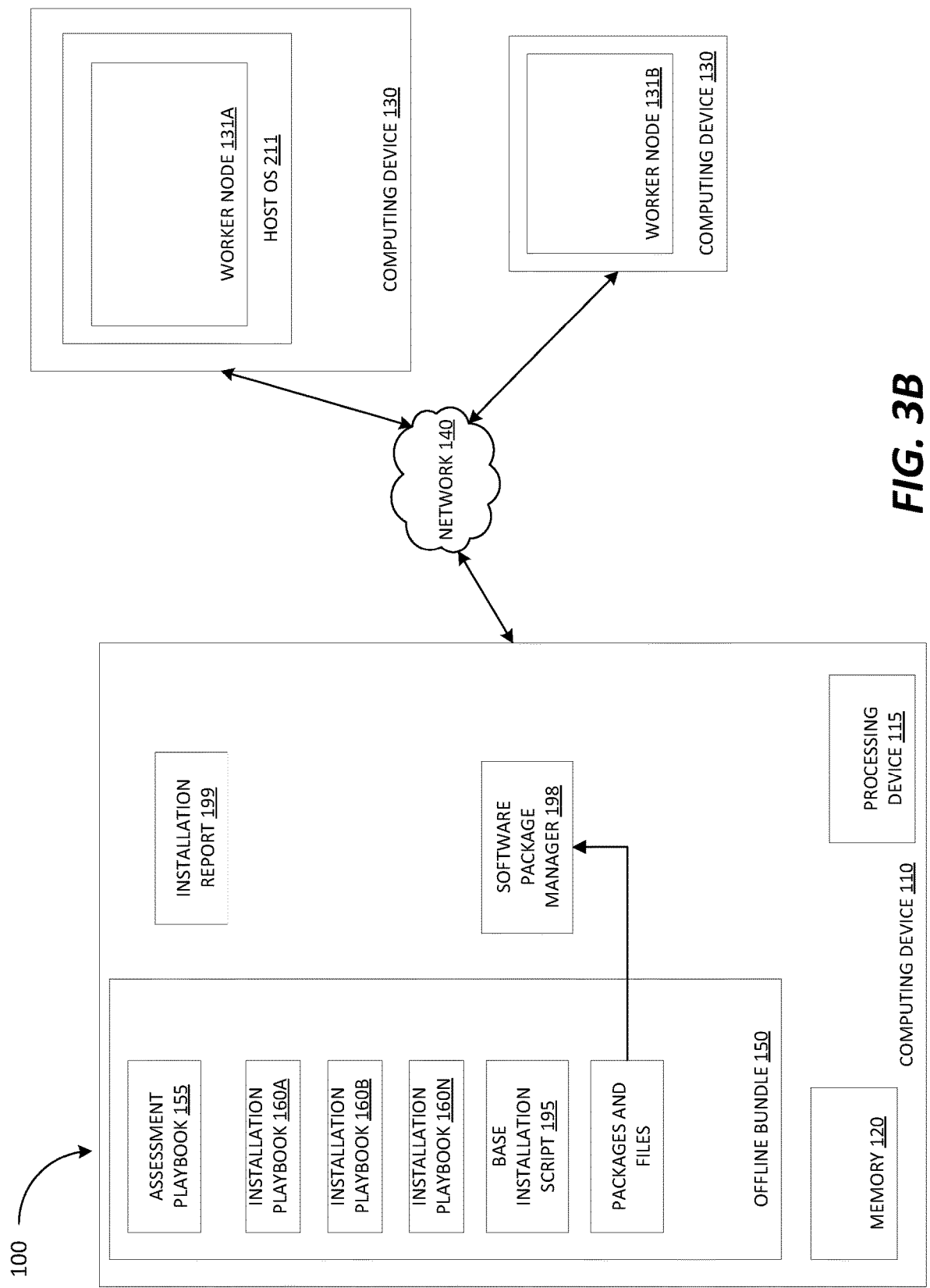
FIG. 3B is a block diagram that illustrates installation of dependencies for missing prerequisite components on a disconnected environment, in accordance with some embodiments of the present disclosure.

Referring now to FIGS. 3A and 3B, offline bundle 150 may include base installation script 195 which may be executed by the computing device 110 in order to perform the functions described herein with respect to installation of dependencies. In some embodiments, the dependencies may be brought in as images and deployed as containerized services using a registry 197. The registry 197 may include images for each of the dependencies, and the base installation script 195 may initially check whether each one has been loaded, and if not, load it from the registry.

More specifically, the base installation script 195 may install the container host installer 190 (e.g., OpenShift installer) which may be an executable brought into the system 100 as part of the offline bundle 150 as discussed hereinabove. The container host installer 190 may transfer dependencies from the offline bundle 150 to a directory 196 (e.g., on computing device 110) where they can be executed. The base installation script 195 may update a local path to the directory 196 and create a directory structure in the directory 196 where exploded images corresponding to each of the dependencies are stored. The base installation script 195 may also install a container host client (e.g., OpenShift client—not shown) which may allow the client to develop, build, deploy, and run applications on the container host.

The base installation script 195 may include functionality to determine whether a registry image exists on the system 100. If no registry image is detected, the base installation script 195 may query the client to load the registry image (e.g., from the offline bundle 150), run the registry 197, and check/set the registry environment. If the registry image exists, the base installation script 195 may run the registry 197 (if it is not already running) as well as check/set the registry environment (not shown). The registry environment may refer to an external registry (separate from registry 197) that is pointed to when container host 214 is set up. In this way, the external registry can be set up as an "image stream" to keep the images in registry 197 up to date. Stated differently, the external registry will be configured to be used by registry 197 as an image stream once the container host 214 is installed. In a connected environment, examples of an external registry could be a corporate registry (test or production etc.) or a registry that is external to an organization such as a public registry (e.g. Dockerhub).

When the registry 197 is started, it is empty, so the container host installer 190 may populate ("hydrate") the registry 197 with the images corresponding to the dependencies (e.g., dnsmasq image, HTTP daemon image) that have been brought into the system 100 as part of the offline bundle 150.

As discussed above, the container host installer 190 may explode the image corresponding to each of the dependencies and put it into the directory 196. When the computing device 110 runs the registry 197, the registry 197 will look at the directory so it can import the appropriate images. However, a disconnected environment such as system 100 may have heightened security requirements including secure protocols when communicating with such services. For example, the system 100 may utilize transport layer security (TLS) for secure communications. Thus, the base installation script 195 may create self-signed certificates for the registry 197 so that when the registry 197 starts running, the computing device 110 can connect to it. Such certificates may allow for secure installation and verification of the registry 197. The base installation script 195 may also check for existing registry certificates (e.g., TLS certificates) which can be used to verify the registry 197.

The dependencies may then be deployed as containerized services using the registry 197. Deployment of dependencies as containerized services also allows such dependencies to become modularized, and thus available on demand. Instead of one big script, it can be broken up into sections. Stated differently, the playbook or script can be broken into sub playbooks/scripts as discussed earlier with respect to the automation playbook 180 where instead of one large playbook and script, we have a playbook that calls other playbooks that deploy the single dependency using e.g., Podman or Docker. This prevents the computing device 110 from having to un-tar a new image when it comes in (e.g., a tar file), return it to the local repository, and rehydrate it back up, since the computing device 110 can now do it in sections.

The base installation script 195 may also include functions to determine whether images for each of the dependencies exist or not, functions to check whether certain dependencies are running, and functions to run each of the dependencies. The base installation script 195 may include templates to configure particular services based on customer needs. Stated differently, the base installation script 195 may set up these particular services post deployment so that they are available to the other dependencies in the overall system that needs them (e.g., so that the parts of the container host 214 that are dependent can consume them). This set up may be similar to the setup of the external registry and image stream discussed hereinabove (i.e. all installed and deployed dependencies need a post configuration step so that they are fully configured to be used by the container host 214 etc.).

For example, the base installation script 195 may also include functionality to determine whether a dnsmasq image exists on the system 100, and if not, query the client to load the dnsmasq image from the registry 197. If the dnsmasq image exists (or, once it has been loaded from the registry 197), the base installation script 195 may run the dnsmasq (assuming it is not already running). The base installation script 195 may include a template to configure the dnsmasq based on customer needs.

In another example, the base installation script 195 may include functionality to determine whether an HTTP daemon image exists on the system 100, and if not, query the client to load the HTTP daemon image from the registry 197. If the HTTP daemon image exists (or, once it has been loaded from the registry 197), the base installation script 195 may run the HTTP daemon (assuming it is not already running). The base installation script 195 may include a template to configure the HTTP daemon based on customer needs.

Referring now to FIG. 3B, in some embodiments, the dependencies may be brought in as e.g., a zip file along with the assessment playbook 155, images, executables, and binaries of the offline bundle 150. Each of the dependencies may comprise an RPM file (e.g., based on Fedora, RHEL, etc.) or any other appropriate operating system packaging unit. The base installation script 195 may use a software package manager 198 such as e.g., Dandified YUM (DNF) to install each of these dependencies on the computing device 110. The software package manager 198 may install, update, and remove dependencies on the computing device 110. The software package manager 198 may facilitate maintenance of dependencies by automatically checking for further dependencies and determining the actions required to install the dependencies. In some embodiments, the base installation script 195 may define a separate playbook (not shown) that will be used to deploy these dependencies and a callout to this separate playbook is included within the generated automation playbook 180.

After all of the dependencies have been installed, the computing device 110 may execute the automation playbook 180 in order to install each of the prerequisite components, and then may call the assessment playbook 155 again to determine whether the installation of each prerequisite component was successful (e.g., by checking for the existence of each of the prerequisite components as discussed hereinabove). The assessment playbook 155 may also generate an installation report 199 indicating whether the installation of each prerequisite component was successful or not, as well as indicating what prerequisite components were installed and the particular configurations for each installation. Upon determining that each of the prerequisite components was successfully installed, the computing device 110 may install the container host on the system 100.

In some embodiments, the computing device 110 may check (e.g., periodically, at intervals) whether there is a connection to external systems (e.g., the system 100 is temporarily a connected environment). If the computing device 110 determines that such a connection exists, it may connect to one or more of these external systems (e.g., a git repository) and check for updates to any of the playbooks, images, executables, and binaries etc. in the offline bundle 150. Responsive to determining that updates for one or more of the above is available, the computing device 110 may retrieve those updates from the one or more external systems and install each of the updates as discussed herein.

Figure 4:
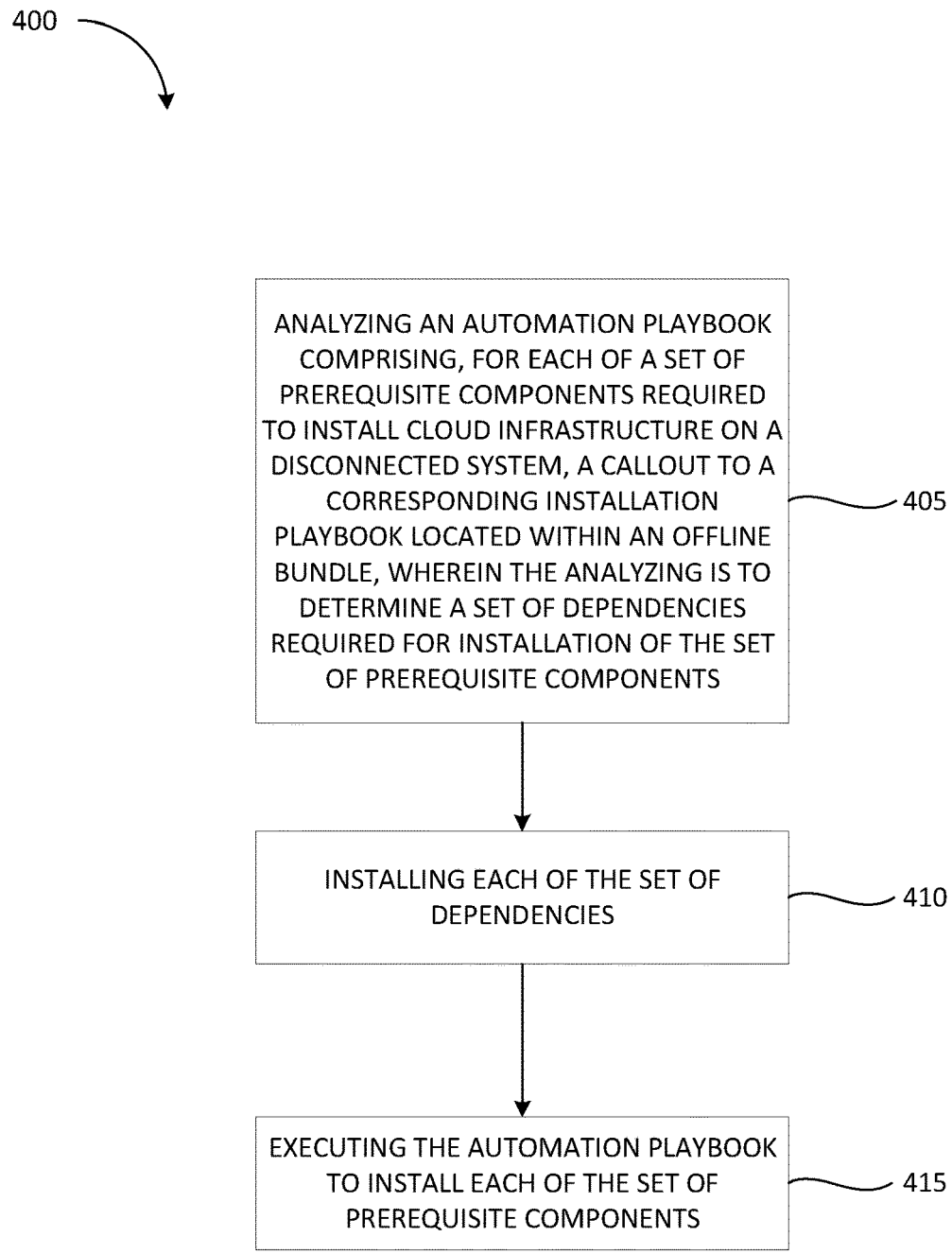
FIG. 4 is a flow diagram of a method for installing dependencies for missing prerequisite components on a disconnected environment, in accordance with some embodiments of the present disclosure.

FIG. 4 is a flow diagram of a method 400 of assessing a disconnected environment and generating a report detailing prerequisite components of cloud infrastructure that are missing from the disconnected environment, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 110 executing the base installation script as illustrated in FIGS. 3A and 3B).

Referring also to FIGS. 3A and 3B, at block 405, the computing device 110 may analyze the automation playbook 180 in order to determine a set of dependencies required for installation of the set of prerequisite components. Stated differently, the automation playbook 180 itself may have dependencies, as each installation playbook 160 may require other packages and files etc. (referred to herein as dependencies—not shown) in order to install the corresponding prerequisite component. Examples of such dependencies may include a registry, a dnsmasq, and an HTTP daemon, among others. There is a high probability that in a disconnected environment, these dependencies will not be available. Thus, these dependencies may be brought in as part of the offline bundle 150.

At block 410, the computing device 110 may install each of the set of dependencies. More specifically, the offline bundle 150 may include base installation script 195 which may be executed by the computing device 110 in order to perform the installation. In some embodiments, the dependencies may be brought in as e.g., a zip file along with the assessment playbook 155, images, executables, and binaries of the offline bundle 150. Each of the dependencies may comprise an RPM file (e.g., based on Fedora, RHEL, etc.) or any other appropriate operating system packaging unit. The base installation script 195 may use a software package manager 198 such as e.g., Dandified YUM (DNF) to install each of these dependencies on the computing device 110. The software package manager 198 may install, update, and remove dependencies on the computing device 110. The software package manager 198 may facilitate maintenance of dependencies by automatically checking for further dependencies and determining the actions required to install the dependencies. In some embodiments, the base installation script 195 may define a separate playbook (not shown) that will be used to deploy these dependencies and a callout to this separate playbook is included within the generated automation playbook 180.

In some embodiments, the dependencies may be brought in as images and deployed as containerized services using a registry 197. The registry 197 may include images for each of the dependencies, and the base installation script 195 may initially check whether each one has been loaded, and if not, load it from the registry.

Figure 5:
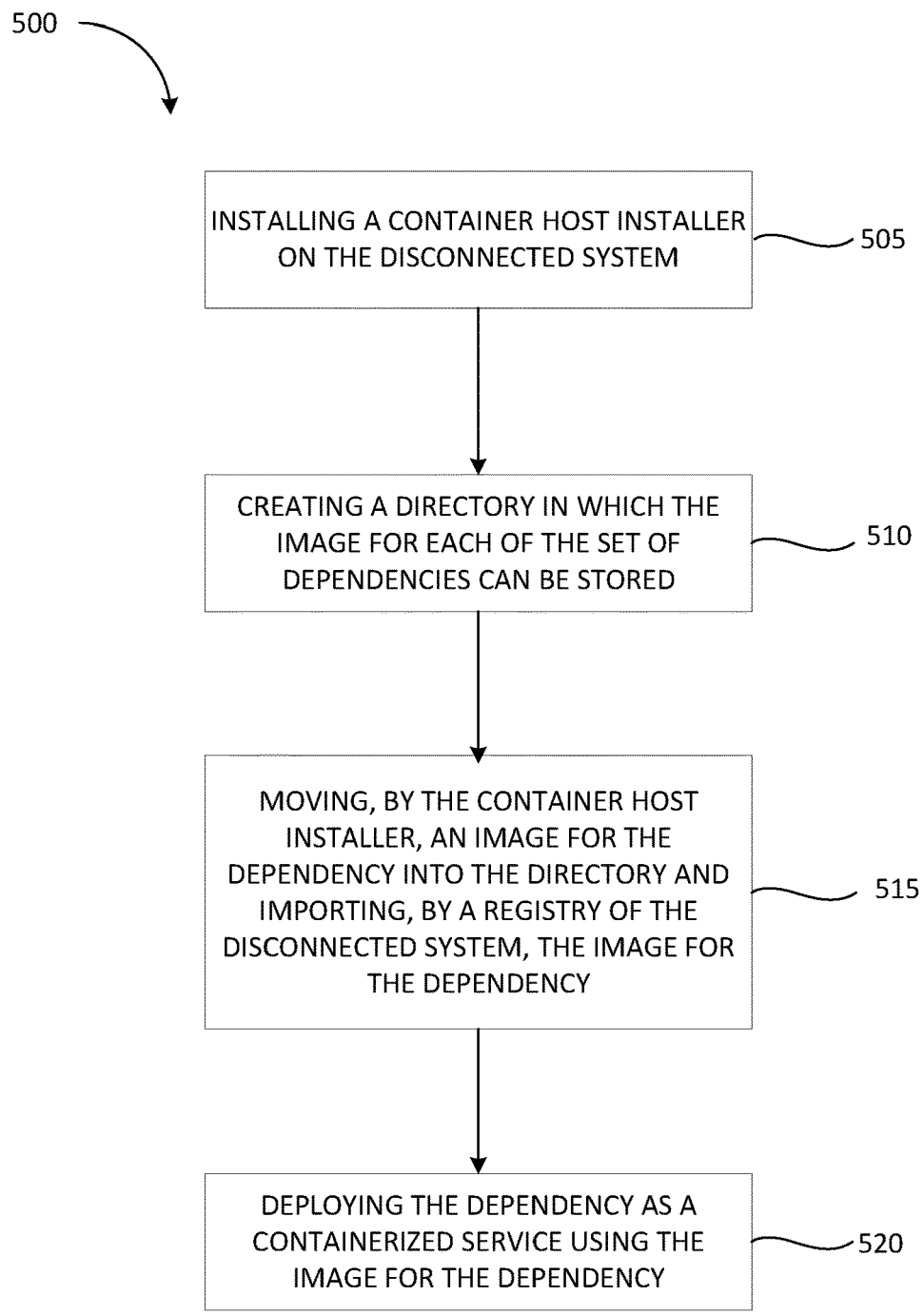
FIG. 5 is a flow diagram of a method for installing dependencies for missing prerequisite components on a disconnected environment as containerized services, in accordance with some embodiments of the present disclosure.

FIG. 5 is a flow diagram of a method 500 for installing dependencies by deploying them as containerized services, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 110 executing the base installation script 195 as illustrated in FIG. 3B).

More specifically, at block 505 the computing device 110 may install the container host installer 190 (e.g., OpenShift installer) which may be an executable brought into the system 100 as part of the offline bundle 150 as discussed hereinabove. At block 510, the computing device 110 may create a directory 196, update a local path to the directory 196, and create a directory structure in the directory 196 where exploded images corresponding to each of the dependencies are stored. The computing device 110 (via container host installer 190) may transfer dependencies from the offline bundle 150 to the directory 196 (e.g., on computing device 110) where they can be executed. The computing device 110 may also install a container host client (e.g., OpenShift client—not shown) which may allow the client to develop, build, deploy, and run applications on the container host.

The computing device 110 (executing the base installation script 195) may function to determine whether a registry image exists on the system 100. If no registry image is detected, the computing device 110 may query the client to load the registry image (e.g., from the offline bundle 150), run the registry 197, and check/set the registry environment. If the registry image exists, the computing device 110 may run the registry 197 (if it is not already running) as well as check/set the registry environment. When the registry 197 is started, it is empty, so the computing device 110 (via the container host installer 190) may populate ("hydrate") the registry 197 with the images corresponding to the dependencies (e.g., dnsmasq image, HTTP daemon image) that have been brought into the system 100 as part of the offline bundle 150.

At block 515, the computing device 110 (via the container host installer 190) may explode the image corresponding to each of the dependencies and put it into the directory 196. When the computing device 110 runs the registry 197, the registry 197 will look at the directory 196 so it can import the appropriate images. However, a disconnected environment such as system 100 may have heightened security requirements including secure protocols when communicating with such services. For example, the system 100 may utilize transport layer security (TLS) for secure communications. Thus, the computing device 110 (via base installation script 195) may create self-signed certificates for the registry 197 so that when the registry 197 starts running, the computing device 110 can connect to it. Such certificates may allow for secure installation and verification of the registry 197. The base installation script 195 may also check for existing registry certificates (e.g., TLS certificates) which can be used to verify the registry 197.

At block 520, the computing device 110 may then deploy each dependency as a containerized service using the registry 197. The base installation script 195 may also include functions to determine whether images for each of the dependencies exist or not, functions to check whether certain dependencies are running, and functions to run each of the dependencies. The base installation script 195 may include templates to configure particular services based on customer needs.

Referring back to FIG. 4, at block 415, after all of the dependencies have been installed, the computing device 110 may execute the automation playbook 180 in order to install each of the prerequisite components, and then may call the assessment playbook 155 again to determine whether the installation of each prerequisite component was successful (e.g., by checking for the existence of each of the prerequisite components as discussed hereinabove). The assessment playbook 155 may also generate an installation report 199 indicating whether the installation of each prerequisite component was successful or not, as well as indicating what prerequisite components were installed and the particular configurations for each installation. Upon determining that each of the prerequisite components was successfully installed, the computing device 110 may install the container host on the system 100.

Figure 6:
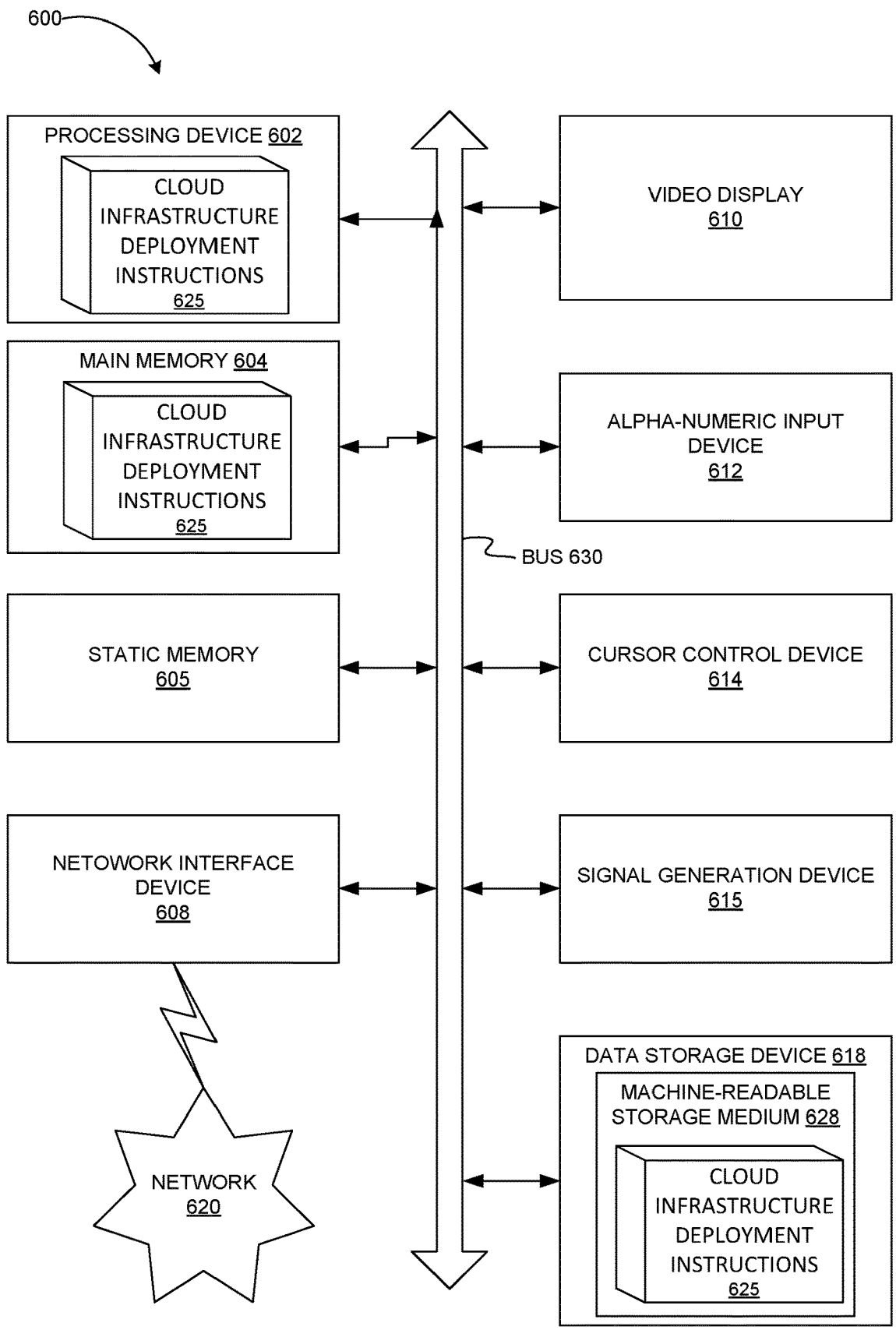
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for specifying a stream processing topology (dynamically creating topics, interacting with these topics, merging the topics, reading from the topics, and obtaining dynamic insights therefrom) via a client-side API without server-side support. The machine may perform a complete assessment of a disconnected environment to determine which prerequisite components (dependencies) necessary for the installation of cloud infrastructure are missing from the disconnected environment. The machine may import an offline bundle into the disconnected environment, wherein the offline bundle comprises an assessment playbook for performing the assessment. The machine may determine initial environment information, perform the assessment, and generate (using the assessment playbook) a report providing information about each of the missing prerequisite components and any additional environment information pertinent thereto. The machine may also generate, based on the report, an automation playbook for installing and deploying the missing prerequisite components. For each missing prerequisite component, the automation playbook may include a callout to an installation playbook corresponding to the missing prerequisite component. The offline bundle may include a set of installation playbooks, each installation playbook providing functionality to install and deploy a particular prerequisite component. It should be noted that the techniques described herein are not limited to installation of simple software on a single machine, but may apply to complex cloud infrastructures deployed across multiple machines. No third party tools are relied on for the assessment of the disconnected environment or the generation of the report or the automation playbook.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute cloud infrastructure deployment instructions 625, for performing the operations and steps discussed herein.

The data storage device 618 may include a machine-readable storage medium 628, on which is stored one or more sets of cloud infrastructure deployment instructions 625 (e.g., software) embodying any one or more of the methodologies of functions described herein. The cloud infrastructure deployment instructions 625 may also reside, completely or at least partially, within the main memory 604 or within the processing device 602 during execution thereof by the computer system 600; the main memory 604 and the processing device 602 also constituting machine-readable storage media. The cloud infrastructure deployment instructions 625 may further be transmitted or received over a network 620 via the network interface device 608.

The machine-readable storage medium 628 may also be used to store instructions to perform a method for deploying cloud infrastructure in a disconnected environment, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    analyzing an automation playbook comprising, for each of a set of prerequisite components required to install cloud infrastructure on a disconnected system, a callout to a corresponding installation playbook located within an offline bundle, wherein the analyzing is to determine a set of dependencies required for installation of the set of prerequisite components;
    installing, by a processing device, each of the set of dependencies; and
    executing the automation playbook to install each of the set of prerequisite components.

2. The method of claim 1, wherein an image for each of the set of dependencies is included within the offline bundle and wherein installing a dependency comprises:
    installing a container host installer on the disconnected system;
    creating a directory in which the image for each of the set of dependencies can be stored;
    moving, by the container host installer, an image for the dependency into the directory;
    importing, by a registry of the disconnected system, the image for the dependency; and
    deploying the dependency as a containerized service using the image for the dependency.

3. The method of claim 1, wherein each of the set dependencies is included within the offline bundle as an operating system (OS) packaging unit, and wherein installing the set of dependencies comprises:
    defining an installation playbook that will utilize a software package manager to install an OS packaging unit for each of the dependencies on the disconnected system; and
    including a callout to the installation playbook within the automation playbook.

4. The method of claim 1, further comprising:
    determining if a connection from the disconnected system to one or more external systems exists; and
    in response to determining that the connection from the disconnected system to one or more external systems exists:
        determining whether updates for each of the set of dependencies are available from the one or more external systems;
        responsive to determining that updates for one or more of the set of dependencies is available, retrieving the updates for the one or more of the set of dependencies from the one or more external systems and installing each of the updates for the one or more of the set of dependencies on the disconnected system.

5. The method of claim 1, further comprising:
generating a report indicating whether each of the set of prerequisite components was successfully installed or not.

6. The method of claim 5, wherein the report further comprises:
an indication of a configuration each of the set of prerequisite components was installed with.

7. The method of claim 5, further comprising:
determining whether each of the set of prerequisite components exists on the disconnected system using an assessment playbook, wherein the assessment playbook comprises a set of roles, each of the set of roles comprising code to determine whether a corresponding prerequisite component of the set of prerequisite components exists in the disconnected environment; and
in response to determining that each of the set of prerequisite components exists in the disconnected system, installing the cloud infrastructure on the disconnected system.

8. A system comprising:
a memory; and
a processing device, operatively coupled to the memory, the processing device to:
analyze an automation playbook comprising, for each of a set of prerequisite components required to install cloud infrastructure on a disconnected system, a callout to a corresponding installation playbook located within an offline bundle, wherein the analyzing is to determine a set of dependencies required for installation of the set of prerequisite components;
install each of the set of dependencies; and
execute the automation playbook to install each of the set of prerequisite components.

9. The system of claim 8, wherein an image for each of the set of dependencies is included within the offline bundle and wherein to install a dependency, the processing device is to:
install a container host installer on the disconnected system;
create a directory in which the image for each of the set of dependencies can be stored;
move, by the container host installer, an image for the dependency into the directory;
import, by a registry of the disconnected system, the image for the dependency; and
deploy the dependency as a containerized service using the image for the dependency.

10. The system of claim 8, wherein each of the set dependencies is included within the offline bundle as an operating system (OS) packaging unit, and wherein to install the set of dependencies, the processing device is to:
define an installation playbook that will utilize a software package manager to install an OS packaging unit for each of the dependencies on the disconnected system; and
include a callout to the installation playbook within the automation playbook.

11. The system of claim 8, wherein the processing device is further to:
determine if a connection from the disconnected system to one or more external systems exists; and
in response to determining that the connection from the disconnected system to one or more external systems exists:
determine whether updates for each of the set of dependencies are available from the one or more external systems; and
responsive to determining that updates for one or more of the set of dependencies is available, retrieve the updates for the one or more of the set of dependencies from the one or more external systems and installing each of the updates for the one or more of the set of dependencies on the disconnected system.

12. The system of claim 8, wherein the processing device is further to:
generate a report indicating whether each of the set of prerequisite components was successfully installed or not.

13. The system of claim 12, wherein the report further comprises:
an indication of a configuration each of the set of prerequisite components was installed with.

14. The system of claim 12, wherein the processing device is further to:
determine whether each of the set of prerequisite components exists on the disconnected system using an assessment playbook, wherein the assessment playbook comprises a set of roles, each of the set of roles comprising code to determine whether a corresponding prerequisite component of the set of prerequisite components exists in the disconnected environment; and
in response to determining that each of the set of prerequisite components exists in the disconnected system, install the cloud infrastructure on the disconnected system.

15. A non-transitory computer-readable medium having instructions stored thereon which, when executed by a processing device, cause the processing device to:
analyze an automation playbook comprising, for each of a set of prerequisite components required to install cloud infrastructure on a disconnected system, a callout to a corresponding installation playbook located within an offline bundle, wherein the analyzing is to determine a set of dependencies required for installation of the set of prerequisite components;
install, by the processing device, each of the set of dependencies; and
execute the automation playbook to install each of the set of prerequisite components.

16. The non-transitory computer-readable medium of claim 15, wherein an image for each of the set of dependencies is included within the offline bundle and wherein to install a dependency, the processing device is to:
install a container host installer on the disconnected system;
create a directory in which the image for each of the set of dependencies can be stored;
move, by the container host installer, an image for the dependency into the directory;
import, by a registry of the disconnected system, the image for the dependency; and
deploy the dependency as a containerized service using the image for the dependency.

17. The non-transitory computer-readable medium of claim 15, wherein each of the set dependencies is included within the offline bundle as an operating system (OS) packaging unit, and wherein to install the set of dependencies, the processing device is to:
define an installation playbook that will utilize a software package manager to install an OS packaging unit for each of the dependencies on the disconnected system; and
include a callout to the installation playbook within the automation playbook.

18. The non-transitory computer-readable medium of claim 15, wherein the processing device is further to:
determine if a connection from the disconnected system to one or more external systems exists; and
in response to determining that the connection from the disconnected system to one or more external systems exists:
determine whether updates for each of the set of dependencies are available from the one or more external systems; and
responsive to determining that updates for one or more of the set of dependencies is available, retrieve the updates for the one or more of the set of dependencies from the one or more external systems and installing each of the updates for the one or more of the set of dependencies on the disconnected system.

19. The non-transitory computer-readable medium of claim 15, wherein the processing device is further to:
generate a report indicating whether each of the set of prerequisite components was successfully installed or not.

20. The non-transitory computer-readable medium of claim 19, wherein the processing device is further to:
determine whether each of the set of prerequisite components exists on the disconnected system using an assessment playbook, wherein the assessment playbook comprises a set of roles, each of the set of roles comprising code to determine whether a corresponding prerequisite component of the set of prerequisite components exists in the disconnected environment; and
in response to determining that each of the set of prerequisite components exists in the disconnected system, install the cloud infrastructure on the disconnected system.

* * * * *